US010754993B2

(12) United States Patent
Weidele et al.

(10) Patent No.: US 10,754,993 B2
(45) Date of Patent: Aug. 25, 2020

(54) ARCHITECTURE TO MITIGATE CONFIGURATION MEMORY IMPRINTING IN PROGRAMMABLE LOGIC

(71) Applicant: NORTHROP GRUMMAN SYSTEMS CORPORATION, Falls Church, VA (US)

(72) Inventors: Kenneth R. Weidele, San Diego, CA (US); Kenneth F. McKinney, San Diego, CA (US); Christopher H. Meawad, Washington, DC (US); Tim Manestitaya, San Diego, CA (US); Allan T. Hilchie, Sierra Vista, AZ (US); Timothy D. Schaffner, Santee, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 200 days.

(21) Appl. No.: 16/141,357

(22) Filed: Sep. 25, 2018

(65) Prior Publication Data

US 2020/0097684 A1    Mar. 26, 2020

(51) Int. Cl.
*G06F 21/78* (2013.01)
*G06F 11/10* (2006.01)
(Continued)

(52) U.S. Cl.
CPC .......... *G06F 21/78* (2013.01); *G06F 11/1004* (2013.01); *G06F 12/1408* (2013.01); *G06F 21/76* (2013.01)

(58) Field of Classification Search
CPC ................................ G06F 21/76; G06F 21/78
See application file for complete search history.

(56) References Cited

U.S. PATENT DOCUMENTS 5,745,403 A    4/1998 Taylor
6,590,798 B1   7/2003 Komatsuzaki
(Continued)

FOREIGN PATENT DOCUMENTS

EP    1324495 A1    7/2003

OTHER PUBLICATIONS

PCT International Search Report of the International Searching Authority dated Dec. 17, 2019 and dated Jan. 7, 2020 for International Application No. PCT/US2019/052203 filed Sep. 20, 2019.
(Continued)

*Primary Examiner* — Ponnoreay Pich
(74) *Attorney, Agent, or Firm* — Shumaker, Loop & Kendrick, LLP; John A. Miller

(57) ABSTRACT

A method and architecture for mitigating configuration memory imprinting in programmable logic devices. At power-up, a configuration memory inversion control determines whether to operate the current power cycle in normal mode or inversion mode, with an objective of equal time in each mode over the system's lifecycle. A configuration memory (CM) input inversion plane is positioned between a CM controller and the CM cells, and a CM output inversion plane is positioned between the CM cells and the FPGA function blocks. When running in inversion mode, data to/from the CM cells is inverted (0's and 1's are swapped) by the input and output inversion planes. By balancing time individual memory addresses spend in high and low voltage states, the system minimizes differences in memory cell stresses, thus reducing memory imprinting effects. The same concept applied to other architectures, such as a processor's external RAM and internal cache, is also disclosed.

20 Claims, 14 Drawing Sheets

(51) Int. Cl.
*G06F 12/14* (2006.01)
*G06F 21/76* (2013.01)

(56) References Cited

U.S. PATENT DOCUMENTS

| | | |
|---|---|---|
| 7,379,325 B1 | 5/2008 | Backus et al. |
| 8,359,447 B1 | 1/2013 | Trimberger |
| 8,495,438 B2 | 7/2013 | Roine |
| 8,667,244 B2 | 3/2014 | Hadley et al. |
| 8,972,744 B1 | 3/2015 | Trimberger |
| 9,646,177 B2 | 5/2017 | Pedersen et al. |
| 2003/0122578 A1* | 7/2003 | Masui .................... G06F 21/76 326/39 |
| 2006/0087875 A1 | 4/2006 | Lueker et al. |
| 2006/0215437 A1 | 9/2006 | Trika et al. |
| 2009/0168487 A1 | 7/2009 | Rodriguez et al. |
| 2009/0172496 A1* | 7/2009 | Roine ................. G06F 11/1008 714/758 |
| 2014/0223113 A1 | 8/2014 | Hadley et al. |
| 2015/0363260 A1 | 12/2015 | Hollis |
| 2020/0097683 A1* | 3/2020 | Weidele .............. G11C 11/4093 |
| 2020/0097684 A1* | 3/2020 | Weidele .................. G06F 21/76 |

OTHER PUBLICATIONS

PCT International Search Report of the International Searching Authority dated Dec. 5, 2019 and dated Dec. 12, 2019 for International Application No. PCT/US2019/052188 filed Sep. 20, 2019.

\* cited by examiner

| POS_THRESH | 5 | | | | | NEG_THRESH | -2 | |
|---|---|---|---|---|---|---|---|---|
| 702 Power Cycle | 704 Operating Duration Per Power Cycle (hrs) | 706 CUMUL. SERVICE TOTAL (hrs) | 708 Oper. Mode | 710 Operating Mode | 712 NORMAL MODE CUMUL. TOTAL (hrs) | 714 INVERSION MODE CUMUL. TOTAL (hrs) | 716 NORMAL MINUS INVERSION DIFFERENCE (hrs) | 718 BALANCE DIFF OVER CUMUL. SERVICE (PERCENT) |
| 1 | 26 | 26 | 0 | normal | 26 | 0 | 26 | 100.0 |
| 2 | 15 | 41 | 1 | inversion | 26 | 15 | 11 | 26.8 |
| 3 | 25 | 66 | 1 | inversion | 26 | 40 | -14 | -21.2 |
| 4 | 18 | 84 | 0 | normal | 44 | 40 | 4 | 4.8 |
| 5 | 22 | 106 | 0 | normal | 66 | 40 | 26 | 24.5 |
| 6 | 20 | 126 | 1 | inversion | 66 | 60 | 6 | 4.8 |
| 7 | 6 | 132 | 1 | inversion | 66 | 66 | 0 | 0.0 |
| 8 | 21 | 153 | 0 | normal | 87 | 66 | 21 | 13.7 |
| 9 | 3 | 156 | 1 | inversion | 87 | 69 | 18 | 11.5 |
| 10 | 3 | 159 | 1 | inversion | 87 | 72 | 15 | 9.4 |
| 11 | 11 | 170 | 1 | inversion | 87 | 83 | 4 | 2.4 |
| 12 | 21 | 191 | 0 | normal | 108 | 83 | 25 | 13.1 |
| 13 | 17 | 208 | 1 | inversion | 108 | 100 | 8 | 3.8 |
| 14 | 22 | 230 | 1 | inversion | 108 | 122 | -14 | -6.1 |
| 15 | 26 | 256 | 0 | normal | 134 | 122 | 12 | 4.7 |
| 16 | 23 | 279 | 1 | inversion | 134 | 145 | -11 | -3.9 |
| 17 | 6 | 285 | 0 | normal | 140 | 145 | -5 | -1.8 |
| 18 | 2 | 287 | 0 | normal | 142 | 145 | -3 | -1.0 |
| 19 | 23 | 310 | 0 | normal | 165 | 145 | 20 | 6.5 |
| 20 | 3 | 313 | 1 | inversion | 165 | 148 | 17 | 5.4 |
| 21 | 25 | 338 | 1 | inversion | 165 | 173 | -8 | -2.4 |
| 22 | 30 | 368 | 0 | normal | 195 | 173 | 22 | 6.0 |
| 23 | 16 | 384 | 1 | inversion | 195 | 189 | 6 | 1.6 |
| 24 | 30 | 414 | 1 | inversion | 195 | 219 | -24 | -5.8 |
| 25 | 8 | 422 | 0 | normal | 203 | 219 | -16 | -3.8 |
| 26 | 23 | 445 | 0 | normal | 226 | 219 | 7 | 1.6 |

FIGURE 7 — 700

ARCHITECTURE TO MITIGATE CONFIGURATION MEMORY IMPRINTING IN PROGRAMMABLE LOGIC

BACKGROUND

Field

The present disclosure relates generally to avoiding memory imprinting in an electronic system's volatile memory or configuration memory and, more particularly, to a method for mitigating volatile/configuration memory imprinting which uses a data inversion scheme and architecture to cause each memory cell to experience electrical high- and low-voltage states for approximately equal amounts of time over the lifetime of the system.

Discussion

In a typical microprocessor-based electronic system, executable binary instructions are allocated to specific and dedicated areas of memory. For a given configuration of executable code, the boot code and executable code typically exist in non-volatile memory ("NVM", e.g. FLASH) when the system is without power. When power is applied to the system, the processor reads the non-volatile memory, and typically copies the contents into faster and larger volatile memory ("VMEM", e.g. SRAM, DRAM, SDRAM, DDR, DDR2/3/4 SDRAM). These instructions stored in volatile memory locations will be identical from power cycle to power cycle. Additionally, memory spaces for data structures (Heap, Stack, I/O buffers, System Variables, etc.) are also allocated to specific and dedicated areas of memory. Although the data held in such data structures tend to be dynamic, some of these values are often the same due to the nature of the system. Over the lifetime of an electronic system, the fixed locations of volatile memory will hold the same data values for thousands to hundreds of thousands of hours. A similar phenomenon occurs in the configuration memory cells of programmable logic devices such as field programmable gate arrays (FPGAs).

Memory imprinting (also known as data remanence) is the result of memory devices holding the same values in the same locations for long periods of time. As discussed above, this is a common occurrence for boot code and executable code which is copied to volatile memory at system power-up. The problem caused by this situation is that memory cell locations can become conditioned to a specific electrical level, either high or low. If power is applied to an electronic system but its processor is prevented from performing its normal boot procedure of copying its executable code from non-volatile memory to volatile memory, the result can be that the volatile memory cells will tend to float to the values they have become conditioned to through continuous experience over the system lifetime.

This becomes a significant problem in embedded systems where security is important as an adversary can extract the imprinted values of the memory cells and reverse engineer the executable code. Even if the executable code is stored at rest in an encrypted state in NVM, the processor must still decrypt the NVM code and store it in VMEM in order to execute the application's instructions. The end effect is that the system becomes an easy target for executable code theft, extraction of cryptographic keying material and reverse engineering. Security critical systems must have protection against a variety of threats (attack vectors). Extraction of executable code and data from such a system can have catastrophic effects—from loss of revenue due to cloning of a product, to loss of technology advantage.

In order to avoid the security risks described above, it is important to prevent memory imprinting (data remanence) in an electronic system's volatile memory. However, previous techniques intended to address memory imprinting have either been only marginally effective (such as erasing all memory at power down, which does not correct the imprinting issue caused by registers holding the same value over long periods of time) or costly and inefficient (such as "ping pong" techniques which have a pair of registers for each memory address, with periodic toggling of the regular and shadow register values, thus resulting in low density and high cost memory).

SUMMARY

The present disclosure describes a method and system for mitigating memory imprinting in configuration memory of a programmable logic device such as a field programmable gate array (FPGA). At system power-up, a configuration memory inversion control determines whether to operate the current power cycle in normal mode or inversion mode, with an objective of equal time spent in each mode over the system's lifecycle. A configuration memory (CM) input inversion plane is positioned between a CM controller and the CM cells, and a CM output inversion plane is positioned between the CM cells and the FPGA function blocks. When running in inversion mode, data to/from the CM cells is inverted (0's and 1's are swapped) by the input and output inversion planes. By balancing the amount of time spent by individual memory addresses in high and low voltage states, the system reduces differences in memory cell stresses, thus reducing memory imprinting issues. The same concept applied to other architectures, such as a processor's external RAM and internal cache memory, is also disclosed.

Additional features of the presently disclosed methods and systems will become apparent from the following description and appended claims, taken in conjunction with the accompanying drawings.

BRIEF DESCRIPTION OF THE DRAWINGS

FIG. 7 is a data table containing operational statistics for 26 power cycles of a system using the architecture of FIG. 2 and the flowchart diagram of FIG. 6;

DETAILED DESCRIPTION OF THE EMBODIMENTS

The following discussion of the embodiments of the disclosure directed to a system and method for mitigating configuration memory imprinting in a programmable logic device is merely exemplary in nature, and is in no way intended to limit the disclosed techniques or their applications or uses.

Figure 1:
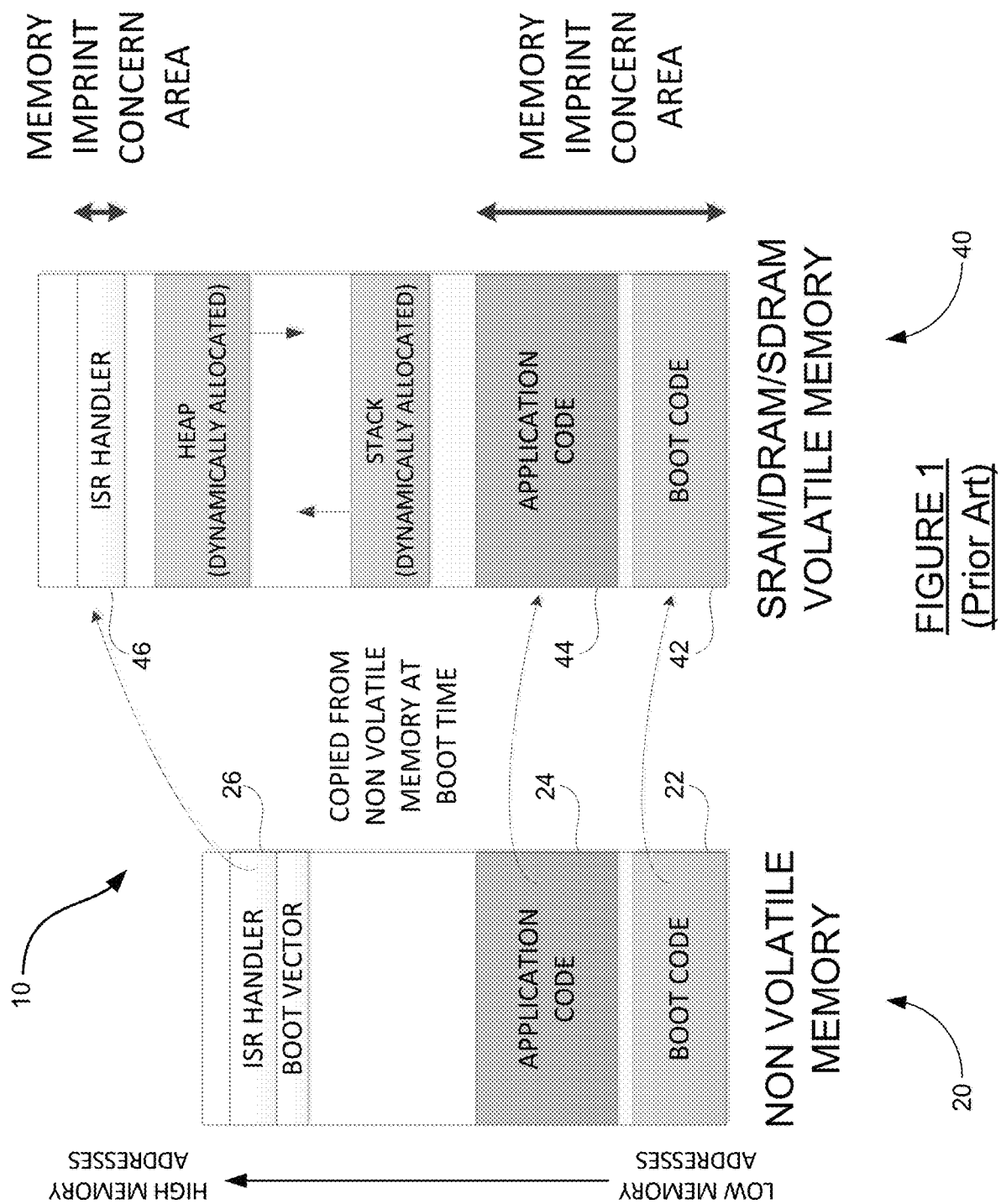
FIG. 1 is a diagram illustrating memory allocation in a typical microprocessor-based electronic system.

FIG. 1 is a diagram 10 illustrating memory allocation in a typical embedded microprocessor-based electronic system. Non-volatile memory (NVM) 20 contains information which persists even when the system is without power. Volatile memory (VMEM) 40 is typically larger and faster than the NVM 20, but is only operational when the system is powered up. The NVM 20 includes, among other things, boot code 22, application code 24 and an interrupt service routine (ISR) handler 26—each of which is copied to the VMEM 40 at boot time.

Because the boot code 22 and the application code 24 are always copied to the low memory addresses at the bottom of the stack in the VMEM 40, the individual bits of this code data will end up in the same VMEM registers for every power cycle. The same is true of the ISR handler 26, which is always copied to the high memory addresses at the top of the heap. Over the lifetime of an electronic system, the fixed locations of these items in volatile memory will hold the same data values for thousands to hundreds of thousands of hours. Thus, the locations of boot code 42, application code 44 and ISR handler 46 in the VMEM 40 become areas of concern for memory imprinting.

The process of storing and holding a data value (1 or 0) to a given volatile memory cell stresses the physical properties of the cell. These stresses act to change the cell's switching threshold voltage and access time due to electrical stressing on internal ionic contaminants, hot carrier (thermal) effects, and electromigration effects. These cell changes are also affected by supply voltage and environmental temperature experienced by the memory device and tend to be cumulative over time. The long term data retention effects are the focus of this disclosure as such effects occur when the same data value is experienced by a given memory cell.

The architecture and methods of the present disclosure allow an embedded electronic system's volatile memory (RAM, DRAM, SDRAM, etc.), over the lifetime of the system, to experience half of its duration with normal data values stored, and the other half of its duration with inverted data values stored. This allows each memory cell to experience an electrical low voltage/charge and an electrical high voltage/charge for nearly equal durations of time. The control of this data inversion occurs at each power cycle. The efficacy of this approach is optimized when a given section of memory holds values which are relatively static over time, such as executable code, as illustrated in the above discussion of FIG. 1. A condition for the use of the disclosed technique is that the system must be one where it is acceptable or required for the system to experience periodic power down and power up cycles. A non-comprehensive list of examples of such systems: embedded systems in vehicles (such as automobiles, helicopters, air vehicles, railroad, and metro/trolly), industrial machinery, and amusement park rides.

Following is a brief discussion of the concepts which are employed in embodiments of the disclosed architecture. The system operation involves alternating the electrical values associated with logic levels written to memory between system power cycles. Over the lifetime of the system, a given memory location will hold "high" and "low" electrical values for approximately equal durations of time, thus achieving a balance of electrical high and low levels over time and therefore imparting electrical stresses equally on the memory cell location. A non-volatile bus mode control register is used to control logical and electrical inversion of the data bus to and from memory. Memory inversion is embodied as a plurality of bits of a number equal to that of the data bus width of the memory. The bus mode control register input is a single bit wide and enables control of the inversion behavior of the entire data bus. A binary "0" allows all data bits to pass thru non-inverted whereas a binary "1" forces all data bit to be inverted in both directions.

The system monitors the proportion of time accumulated in normal mode vs inversion mode and decides which of the two modes is warranted for the next system restart or boot in order to keep time in either mode in balance (within a certain threshold window of overall difference). This decision processing compensates for scenarios where a system is powered on for short periods of time on some occasions and long periods of time on other occasions. Counter timers, accumulators and difference threshold values are used to measure system time to assist in inversion control.

The system uses normal processor architectures with a logic inversion control hardware module. One embodiment is that of a Field Programmable Gate Array (FPGA) with an integral embedded soft or hard processor core as shown in drawings attached. Other embodiments are discrete component based or those implemented in an Application Specific Integrated Circuits (ASICs). Additional embodiments can be implemented in software running inside the processor with the various functions captured in this disclosure implemented as software data structures.

Figure 2:
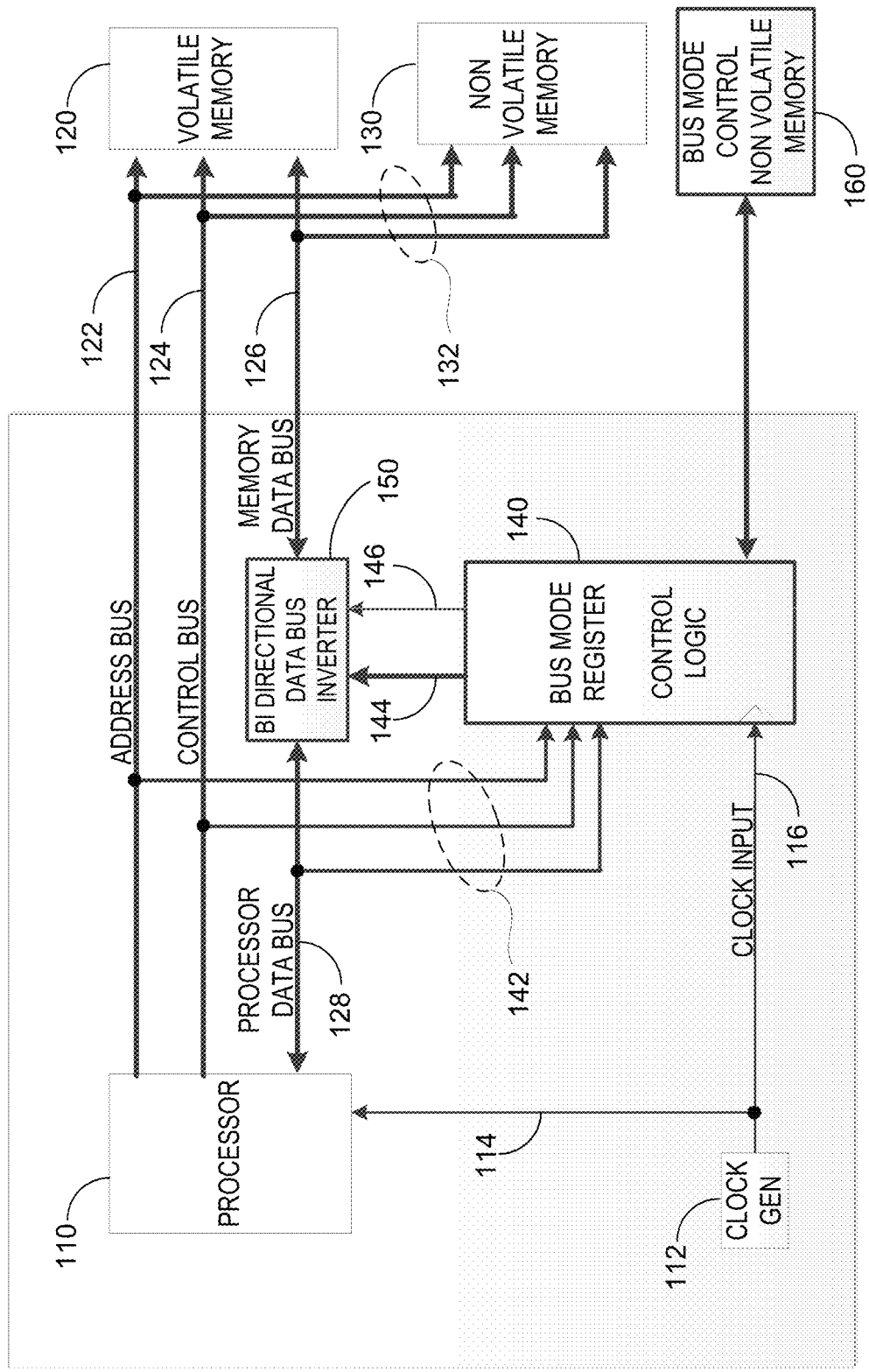
FIG. 2 is a block diagram of a system architecture designed to mitigate volatile memory imprinting, according to an embodiment of the present disclosure.

FIG. 2 is a block diagram of a system architecture 100 designed to mitigate memory imprinting, according to an embodiment of the present disclosure. Blocks 140, 150 and 160—discussed below—are added to a conventional architecture to provide the features of the disclosed embodiment. The features and functions of the conventional architecture will be discussed first.

A processor 110 provides the fundamental calculation and processing capability of the architecture 100. The processor 100 is a general purpose processor with standard Address, Control and Data bus input/output (I/O), as would be understood by one skilled in the art. A system clock generator 112 provides the clock function of the circuit, also in a conventional manner. The clock generator 112 communicates with the processor 110 on line 114. General Purpose Volatile Memory (VMEM) 120 and General Purpose Non-Volatile Memory (NVM) 130 serve the memory needs of the architecture 100 in the manner discussed above with respect to FIG. 1. The VMEM 120 of FIG. 2 equates to the volatile memory 40 of FIG. 1, and the NVM 130 of FIG. 2 equates to the volatile memory 20 of FIG. 1.

The processor 110 accesses the VMEM 120 via address bus 122, control bus 124 and a data bus. In FIG. 2, the data bus has two parts—a memory data bus 126 and a processor data bus 128. In a conventional architecture, there would be a single continuous data bus running from the processor 110 to the VMEM 120. Upon system boot-up, the contents of the NVM 130 are loaded to the VMEM 120, in the manner discussed above regarding FIG. 1. Lines 132 provide communication between the NVM 130 and the VMEM 120 via the three busses 122/124/126.

The preceding two paragraphs describe the basic operation of a traditional circuit without the disclosed techniques for mitigating memory imprinting. Following is a discussion of the architecture 100 using the additional elements for mitigating memory imprinting.

A bus mode register control 140 performs the calculations to determine whether normal or inverted memory control is used on each boot-up. This block takes in system status information at boot-up and makes the decision for which data mode to use for this duration of power application: Normal (data pass thru) or Inverted. A clock input line 116 provides system clock time from the clock generator 112 to the bus mode register control 140 for cumulative time calculations. Lines 142 provide communication between the bus mode register control 140 and the three busses 122/124/128. The bus mode register control 140 is shown in FIG. 3 and discussed below.

Figure 4:
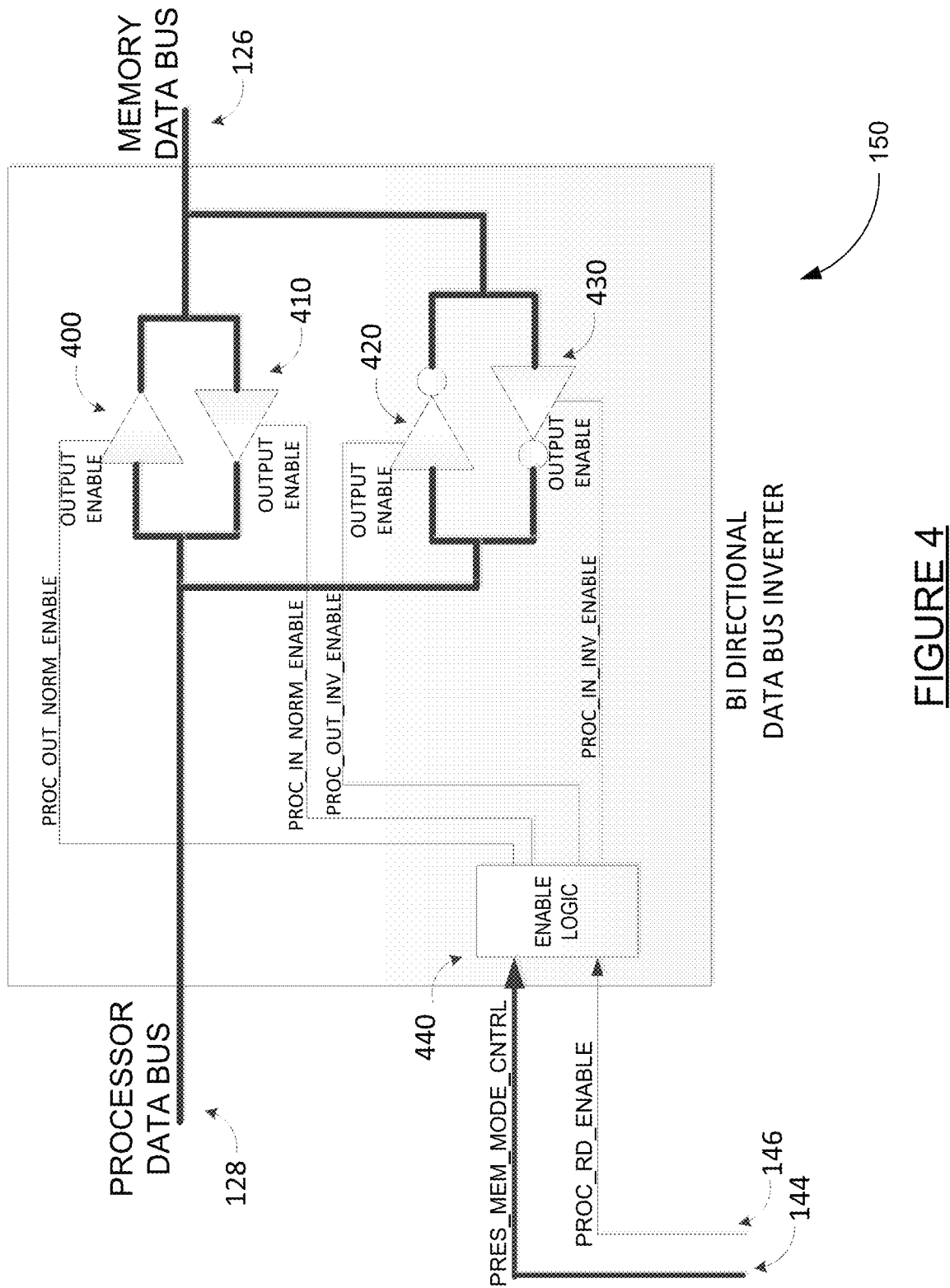
FIG. 4 is a block diagram of a bi-directional data bus inverter shown in FIG. 2.

A bi-directional data bus inverter 150 receives instructions from the bus mode register control 140 (whether to operate in Normal or Inverted mode) on lines 144 and 146, and handles data flow on the memory data bus 126 and the processor data bus 128. Here it is important to remember that the processor 110 is a standard processor which is not reprogrammed to support memory imprint mitigation. The processor expects to receive application code and other data from the VMEM 120 in a conventional manner. However, because certain data in the VMEM 120 may be inverted, the data bus inverter 150 must handle the inversion of that data, both ways, in communications between the memory data bus 126 and the processor data bus 128. The data bus inverter 150 is shown in FIG. 4 and discussed below.

Figure 5:
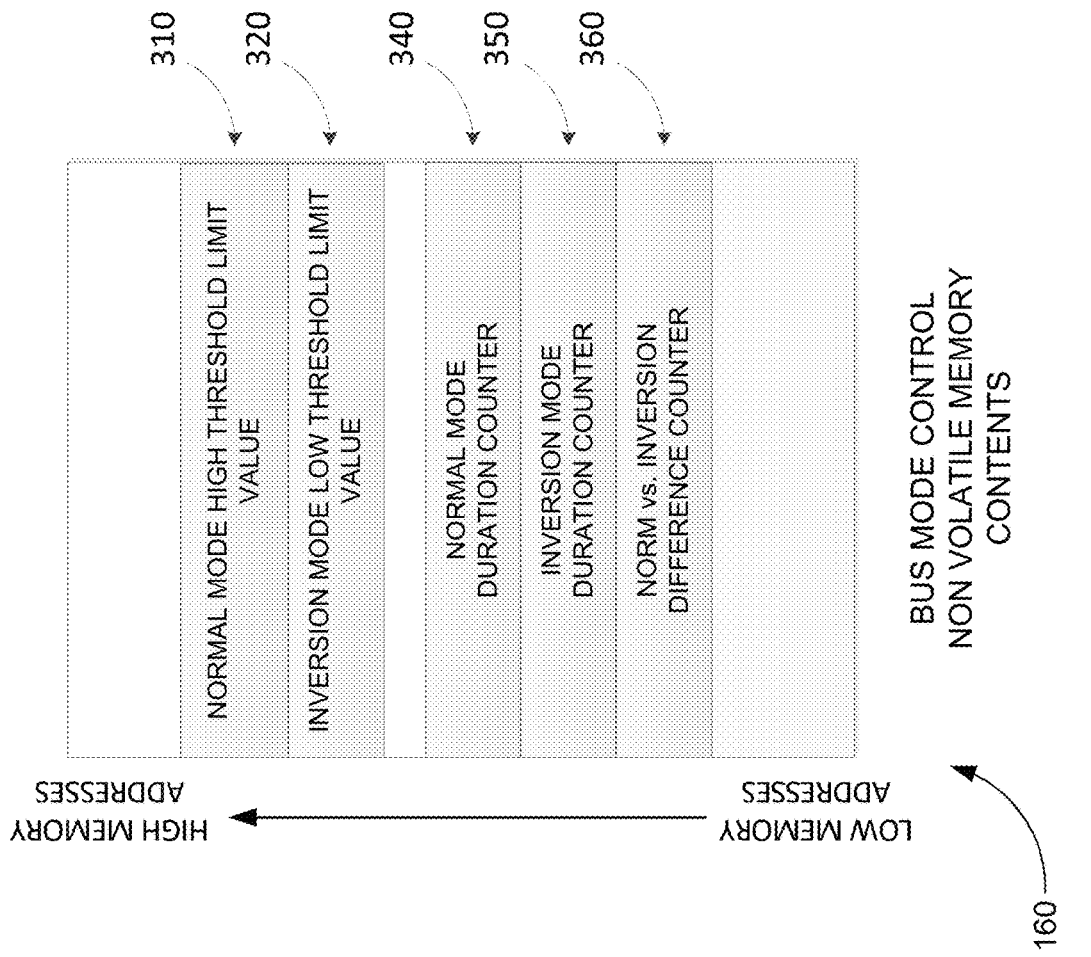
FIG. 5 is a diagram illustrating memory allocation in a bus mode control non-volatile memory, shown previously in FIGS. 2 and 3.

Bus Mode Control Non-volatile Memory 160 stores bus mode control status information when the system is powered off, so that this information can be used by the bus mode register control 140 at the next power-up event. The Bus Mode Control Non-volatile Memory 160 is shown in FIG. 5 and discussed below.

Figure 3:
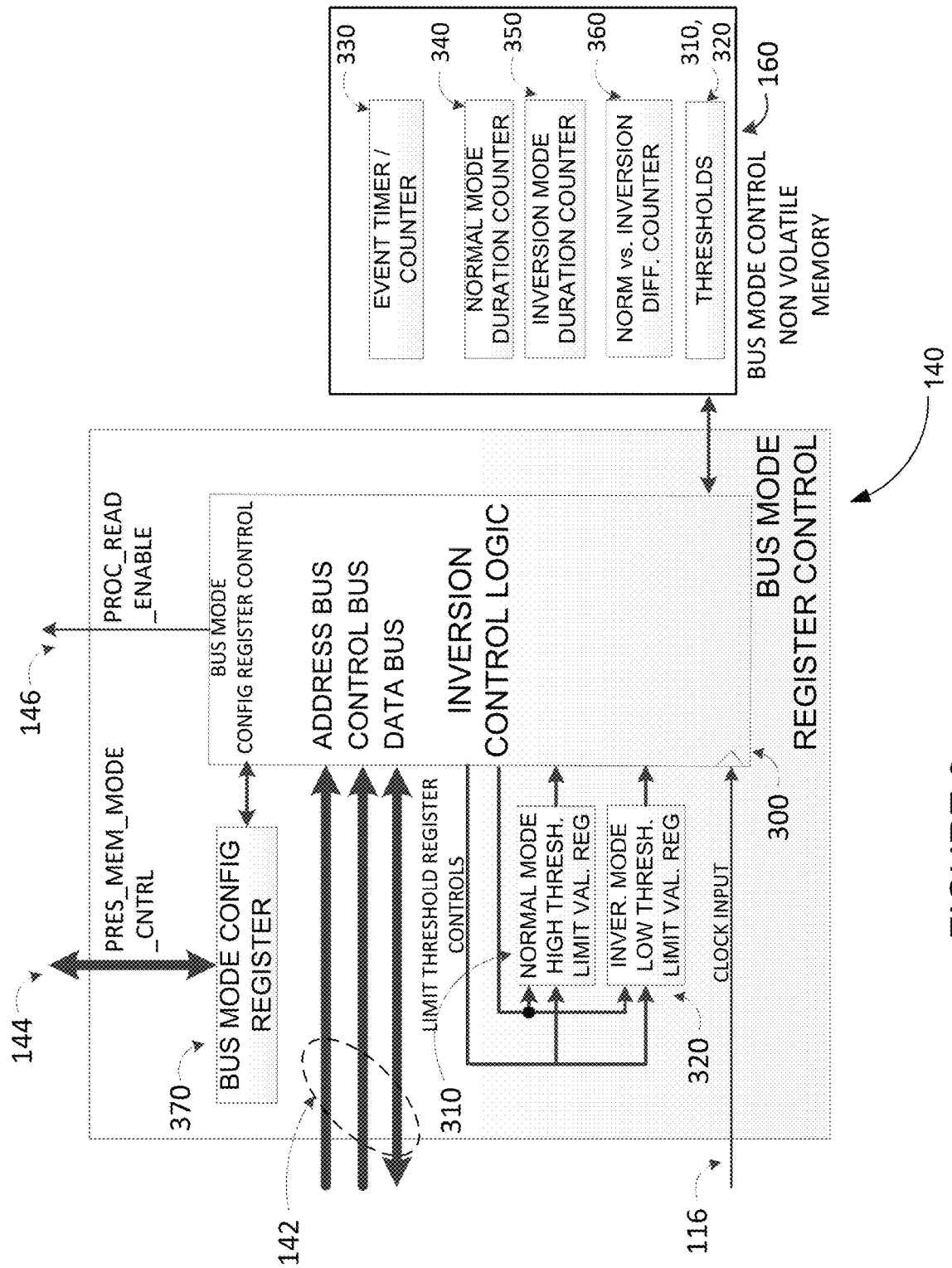
FIG. 3 is a block diagram of a bus mode register control shown in FIG. 2.

FIG. 3 is a block diagram of the bus mode register control 140 first shown in FIG. 2. As discussed above, the bus mode register control 140 determines, upon system start-up, whether the current power cycle should operate in normal mode or inversion mode. The bus mode register control 140 also manages all parameters and counters associated with this computation. As seen in FIG. 2, the bus mode register control 140 receives clock input on line 116, I/O from the address bus, control bus and data bus on the lines 142, and reads/writes a group of counters and thresholds 310/320/330/340/350/360 to/from the bus mode control non-volatile memory 160.

An inversion control logic module 300 processes the counters and thresholds, along with a current event timer/counter 330, to determine which memory mode to use. A concise explanation of the logic is as follows: bus mode register control 140 first reads the contents of bus mode control non-volatile memory 160 and stores these values in registers 310, 320, 340, 350, 360. The normal vs. inversion mode difference counter 360 (at the most recent system power down) is first validated by comparing its value to that of the normal mode duration counter 340 minus the inversion mode duration counter 350. If these values match, the normal vs. inversion mode difference counter 360 is valid. Next, if the difference counter shows that the system has accumulated more time in normal mode than in inversion mode, then the next start-up will be set to inversion mode; and vice versa. The thresholds 310 (normal mode high threshold limit value) and 320 (inversion mode low threshold limit value) can be used to tailor the toggle behavior of the system—to trigger mode reversal at non-zero difference values such as +1 and −1, for example.

Based on the calculations in the inversion control logic module 300, a bus mode configuration register 370 (a single bit) is set to either normal mode (0) or inversion mode (1). The value of the bus mode configuration register 370 is provided to the data bus inverter 150 on the line 144. The inversion control logic module 300 also monitors the activity on the address bus, control bus and data bus, and sends a processor read enable flag on the line 146 when the processor 110 is reading data from the VMEM 120.

FIG. 4 is a block diagram of the bi-directional data bus inverter 150 first shown in FIG. 2. The data bus inverter 150 controls communication between the memory data bus 126 (data in/out of the VMEM 120) and the processor data bus 128 (data in/out of the processor 110). The data bus inverter 150 receives the present memory mode control bit (the bus mode configuration register 370) on the line 144, and the processor read enable flag on the line 146. Based on these inputs, an enable logic module 440 controls gates 400/410/420/430 to properly handle data flow.

The gates 400 and 410 are pass-through gates which do not invert data bits. The gates 420 and 430 are inversion gates which do invert data bits. Each of the gates 400/410/420/430 is enabled, if appropriate, based on a signal from the enable logic module 440 as follows.

If the processor read enable flag is not set (meaning the processor is writing) and the present memory mode control bit is 0 (normal mode), then the pass-through gate 400 is enabled—allowing bits on the processor data bus 128 (from the processor 110) to pass to the memory data bus 126 (to the VMEM 120) without inversion.

If the processor read enable flag is set (meaning the processor is reading) and the present memory mode control bit is 0 (normal mode), then the pass-through gate 410 is enabled—allowing bits on the memory data bus 126 (from the VMEM 120) to pass to the processor data bus 128 (to the processor 110) without inversion.

If the processor read enable flag is not set (meaning the processor is writing) and the present memory mode control bit is 1 (inversion mode), then the inversion gate 420 is enabled—causing bits on the processor data bus 128 (from the processor 110) to be inverted as they pass to the memory data bus 126 (to the VMEM 120).

If the processor read enable flag is set (meaning the processor is reading) and the present memory mode control bit is 1 (inversion mode), then the inversion gate 430 is enabled—causing bits on the memory data bus 126 (from the VMEM 120) to be inverted as they pass to the processor data bus 128 (to the processor 110).

FIG. 5 is a diagram illustrating memory allocation in the bus mode control non-volatile memory 160, seen previously in FIGS. 2 and 3. The schema of FIG. 5 simply shows one technique for allocating the threshold values 310 and 320, and the counter values 340, 350 and 360, to memory addresses in the NVM 160. The important point is that these values are stored during system power off and used by the bus mode register control 140 at the next power-up. The current event timer/counter 330 may also be contained in the bus mode control non-volatile memory 160, as shown in FIG. 3.

Figure 6:
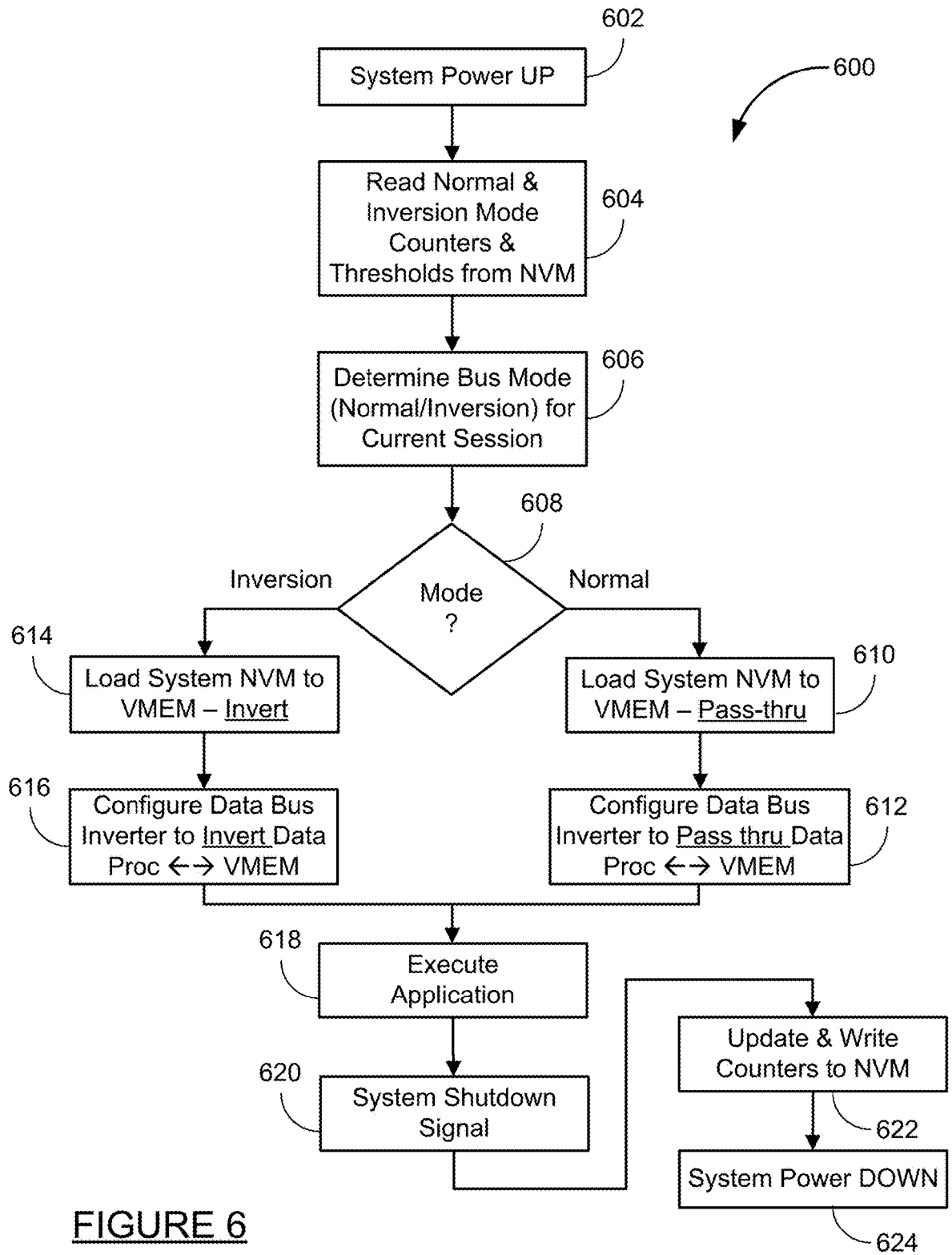
FIG. 6 is a flowchart diagram of a method for memory imprint mitigation using the architecture of FIG. 2 and the details shown in the diagrams of FIGS. 3-5.

The above discussion of FIG. 2 (System architecture 100 for memory imprint mitigation), and FIGS. 3-5 (details of modules 140, 150 and 160), provides a complete explanation of the physical implementation of an embodiment of the disclosed memory imprint mitigation. FIG. 6 is a flowchart diagram 600 of a method for memory imprint mitigation using the architecture 100 of FIG. 2 and the details shown in the diagrams of FIGS. 3-5.

At box 602, the system is powered up to begin operation. At box 604, normal and inversion mode counters and thresholds are read from the bus control mode NVM 160 by the bus mode register control 140. The counters were updated and rewritten to the bus control mode NVM 160 at a previous system shutdown. At box 606, the bus mode register control 140 determines the memory data bus mode for the current power-up session. If the normal vs. inversion time difference counter 360 is greater than a first threshold, the current bus mode will be set to inversion mode. If the normal vs. inversion time difference counter 360 is less than a second threshold, the current bus mode will be set to normal mode. The thresholds may both be set to zero, or they may be positive and negative non-zero values, as best suited for a particular application.

At decision diamond 608, the process branches based on the current bus mode. If the memory data bus mode for the present session is normal mode, then at box 610 the system NVM 130 is loaded to the VMEM 120 in a standard fashion—without inversion. At box 612, the bi-directional data bus inverter 150 is configured to pass through data between the processor 110 and the VMEM 120 without inversion.

If, at the decision diamond 608, the memory data bus mode for the present session is inversion mode, then at box 614 certain portions of the system NVM 130 are loaded to the VMEM 120 in an inverted fashion by the processor 110. The inverted addresses include the boot code, the application code and the ISR. At box 616, the bi-directional data bus inverter 150 is configured to invert data bits as they pass between the processor 110 and the VMEM 120.

At this point it is worthwhile to emphasize the effect of the architecture 100 and the process in the flowchart 600. In normal mode (boxes 610 and 612), data bits from the NVM 130 having a logic value of 0 are stored by the processor 110 as an electrical low voltage in their addresses in the VMEM 120, and data bits having a logic value of 1 are stored by the processor 110 as an electrical high voltage in their addresses. In inversion mode (boxes 614 and 616), the same data bits from the NVM 130 having a logic value of 0 are stored as an electrical high voltage in their addresses in the VMEM 120, and the data bits having a logic value of 1 are stored as an electrical low voltage in their addresses. Because normal and inversion modes are controlled by the disclosed method to be roughly equal in time over the system lifecycle, the inversion of electrical voltage levels mitigates memory imprinting (data remanence) effects in the VMEM 120.

At box 618, the application software is executed by the processor 110 communicating with the VMEM 120. The application software does not know or care that the data bus may be inverted on its way to/from the VMEM 120, as the processor 110 sees the same normal data values regardless of whether normal or inversion mode is in effect. The data bus inverter 150 handles the inversion in both directions, if applicable, and the VMEM 120 benefits from the memory imprinting mitigation.

At box 620, when the application execution is complete (or the vehicle or machine is turned off), a system shutdown signal is provided. At box 622, the counters (normal mode counter 340, inversion mode counter 350 and difference counter 360) are updated and their values are written to the bus mode control NVM 160 for use at the next power-up. For example, if the current session was running in inversion mode, then the inversion mode duration counter will be updated by adding the current session time count from block 330 to the previous value of the inversion mode counter. After the counters 340-360 are updated and written to the bus mode control NVM 160 at the box 622, the system is actually powered down at box 624.

FIG. 7 is a data table 700 containing operational statistics for 26 power cycles of an example system using the architecture 100 of FIG. 2 and the flowchart diagram 600 of FIG. 6. Column 702 simply contains the sequential number of the power cycle of the system. Column 704 contains the duration of each power cycle. It can be seen in column 704 that power cycle durations vary dramatically, from a low of two hours to a high of 30 hours. It is for this reason that a normal/inversion duration counter is used, rather than simply toggling between normal and inversion mode at each power-up. Column 706 contains cumulative service hours for the system 100, which is simply a running total of column 704.

Columns 708 and 710 indicate the operating mode (normal or inversion) that is used for each power cycle, where column 708 contains the actual mode bit from the register 370, and column 710 contains the descriptive word. Column 712 contains the cumulative time counter in normal mode. It can be seen that when column 710 reads normal, column 712 increments by the amount in column 704. Column 714 contains the cumulative time counter in inversion mode. It can be seen that when column 710 reads inversion, column 714 increments by the amount in column 704. Column 716 contains the difference between normal and inversion mode time counters, thus indicating whether the system has spent more hours in normal mode (positive) or inversion mode (negative). Column 718 expresses the balance column 716 as a percentage of the cumulative service hours column 706.

The normal mode cumulative hours total in column 712 represents the value in the block 340 of FIGS. 3 and 5. The inversion mode cumulative hours total in column 714 represents the value in the block 350 of FIGS. 3 and 5. The normal minus inversion difference hours total in column 716 represents the value in the block 360 of FIGS. 3 and 5. The thresholds 310 and 320 are also shown at the top of the table 700.

It can be seen in columns 716 and 718 that the normal minus inversion difference remains centered on zero— generally oscillating between values of about +/−25 hours and tending toward a small percentage value. In contrast, the cumulative service hours total has climbed into the hundreds in just this small sample of power cycles, and can be understood to climb to many thousands of hours over the system lifecycle. Instead of subjecting each address in the VMEM 120 to the many thousands of hours of the same voltage level, the disclosed method and system cause a near equal balance of high and low voltage time at each address. This balance imparts electrical stresses equally on the memory cell location, thus making detection of memory imprinting significantly more difficult.

The preceding discussion of FIGS. 2-6 describes SRAM in embedded systems devices connected to a microprocessor. An embodiment of the architecture 100 would be discrete SRAM devices soldered to a circuit card assembly (CCA). However, additional use cases for memory imprint mitigation have been identified and are discussed below. The memory imprinting mitigation scheme described in this disclosure also applies to portions of virtually all SRAM-based programmable logic, microprocessors (L1, L2 and L3 Cache), microcontrollers, and digital signal processors (Instruction Cache). The following discussion describes these use cases.

Memory imprinting mitigation of cache memory elements internal to a digital processor can be realized through modification to a discrete integrated circuit-based processor (microprocessor, digital signal processor (DSP), graphics processor unit (GPU) or similar devices). In such devices the processor often includes internal volatile memory-based data structures such as cache memory (Level 1 cache—typically split into separate Instruction and Data caches, Level 2 and Level 3 cache and Translation Lookaside Buffers). These internal memory structures enable faster processor instruction execution by reducing the number of external memory reads (fetches). Processor reads and writes of external memory adds significant time overhead compared to processor access of internal registers, internal cache memory and other memory structures.

Cache memory structures speed up processing throughput by copying more memory than needed when the processor reads contents from external memory. The larger amount of memory read is stored (written) into cache memory residing internally to the processor. Should the processor need to access memory whose address is close to that just previously used to fill the cache, the cache itself can provide its local copy of the contents, greatly increasing the processing by removing the need for an external memory access. Such internal volatile memory data structures use transistor structures found in other portions of the processor (ALU, memory management unit, etc.) and are also susceptible to memory imprinting. The benefit of mitigating memory imprinting for such structures is a function of the duration of specific portions of memory contents existing in the same locations in the cache. For instance, memory contents in the form of processor instructions may be a more useful target for an attacker than that of data values in the cache since processor instructions tend to stay the same, while the data being operated upon by the processor and its instructions tends to vary.

It is noted that there are many topologies for cache memory structures, such as; direct mapped (one-way), two-way, four-way to N-way set associative caches, victim cache, trace cache, write coalescing cache, and micro-operation cache. The intent of the architectures disclosed below is to mitigate memory imprinting in any such cache memory topology integral to a processor.

Figure 8:
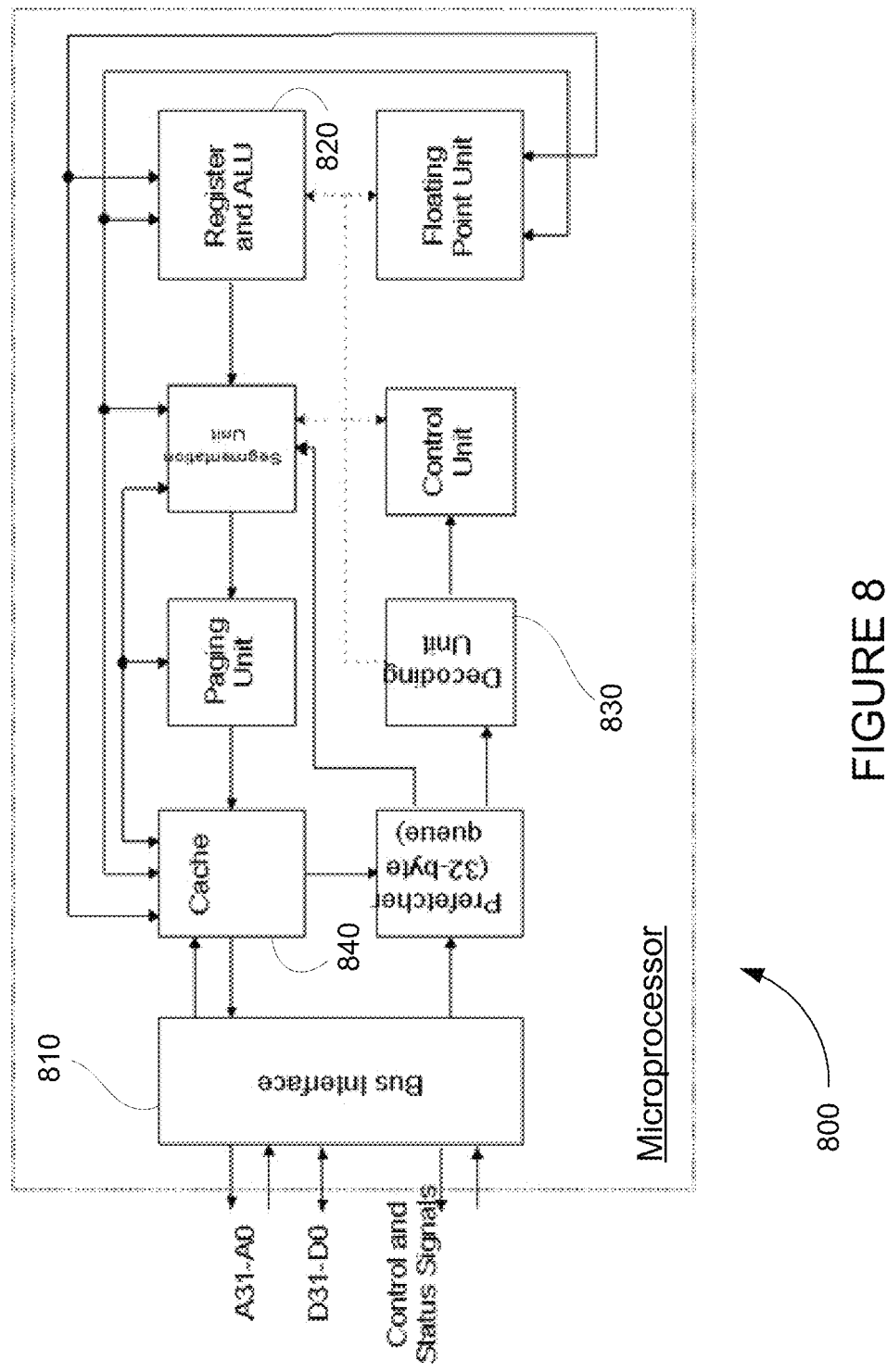
FIG. 8 is a block diagram of a generalized microprocessor with integral cache memory, where the disclosed memory imprinting mitigation techniques can be implemented in the cache memory.

FIG. 8 is a block diagram of a generalized microprocessor 800 with integral cache memory, where the disclosed memory imprinting mitigation techniques can be implemented in the cache memory. The microprocessor 800 includes an external memory bus interface 810, an Arithmetic Logic Unit (ALU) 820, an instruction decoder 830 and an internal memory structure known as a cache 840. The cache 840 is a block of SRAM memory which is used to copy a corresponding block of external memory such that instructions and data can be accessed faster if the processor integrated circuit (IC) does not have to access external memory. When a processor IC has to access memory outside the IC package boundary, the process takes several memory cycle time periods to go out to external memory, read the contents, move the contents back into the processor, and execute the instructions. Access to the cache memory 840 is much faster and speeds processing throughput.

The internal cache memory 840 tends to hold the same values for periods of time, thus making this structure vulnerable to memory imprinting. There can be as many as three cache blocks in present day processors with a "Level 1" cache being the smallest in size but faster in processor execution, "Level 2" being intermediate in size and speed, and "Level 3" being largest in size but slower than Level 1 and level 2 cache structures. Memory imprint mitigation can be implemented in the cache 840 by adding inverters between the cache 840 and the bus interface 810, and between the cache 840 and other elements of the processor IC. This is described further below in discussion of FIG. 10.

Figure 9:
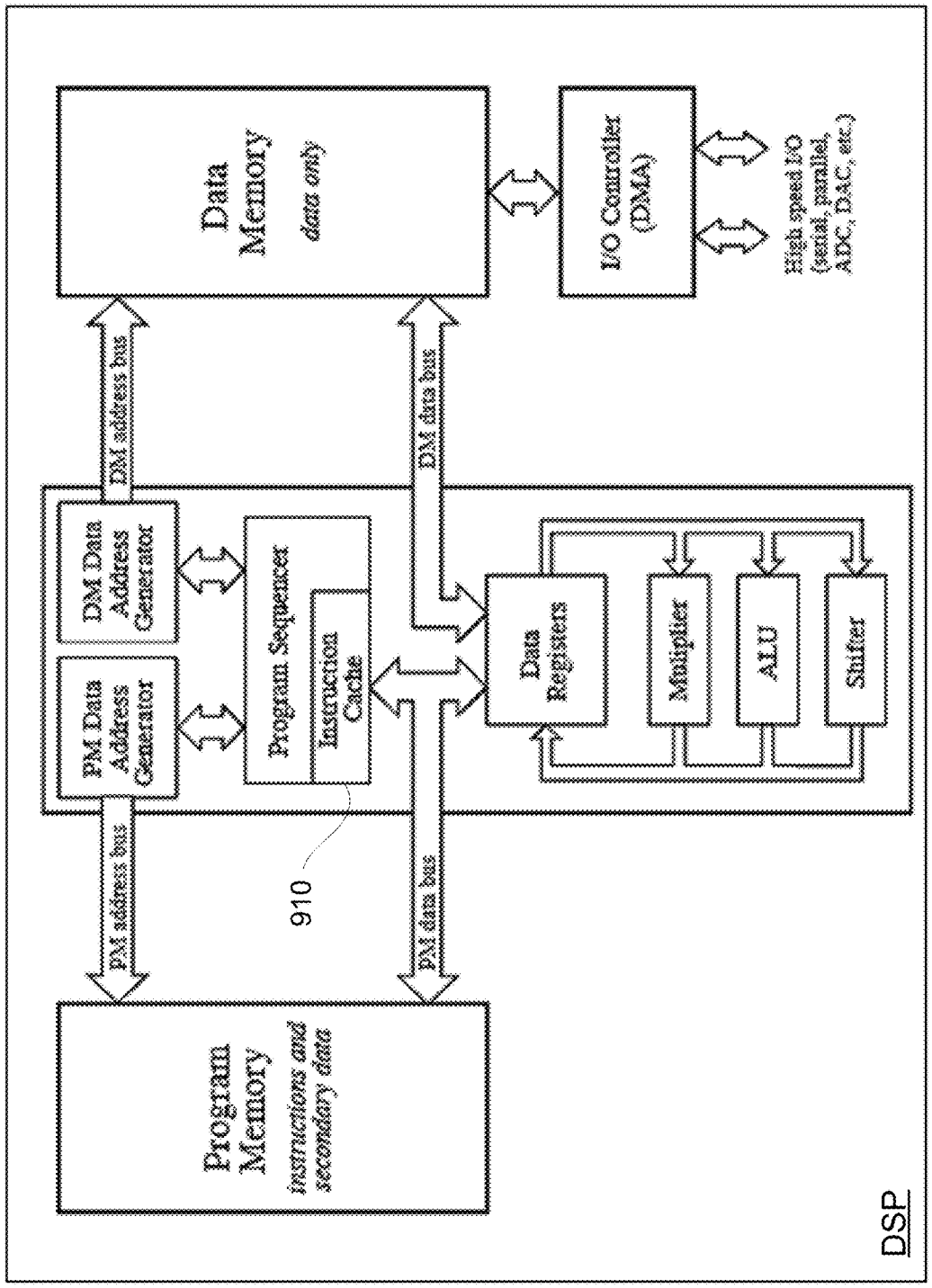
FIG. 9 is a block diagram of a digital signal processor with instruction cache, where the disclosed memory imprinting mitigation techniques can be implemented in the instruction cache.

FIG. 9 is a block diagram of a digital signal processor 900 with instruction cache, where the disclosed memory imprinting mitigation techniques can be implemented in the instruction cache. Digital signal processor (DSP) ICs are specialized versions of a microprocessor in that the DSP architecture is optimized to perform the mathematical operations required of signal processing applications. DSP ICs have a reduced instruction set compared to general purpose microprocessors, but gain in efficiency due to hardware-centric processing blocks (for instance, multiply and accumulate blocks). Like the microprocessor 800 of FIG. 8, the DSP 900 also uses internal SRAM cache for the same reasons as a general purpose processor. The DSP 900 includes instruction cache 910 which may hold the same values for extended periods of time and be vulnerable to memory imprinting. The instruction cache 910 can also benefit from the disclosed memory imprint mitigation techniques, as discussed below.

Figure 10:
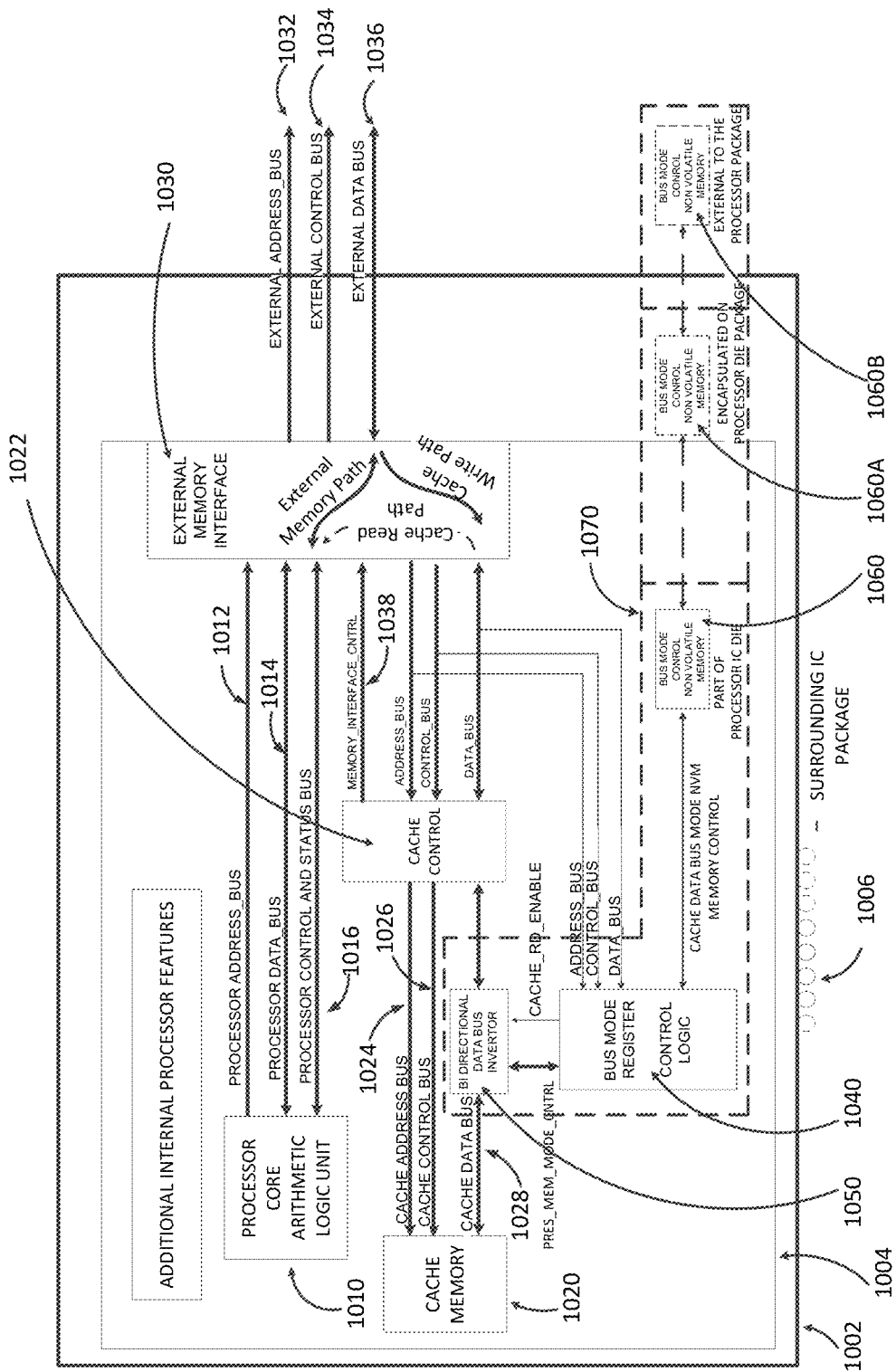
FIG. 10 is a block diagram of a system architecture designed to mitigate memory imprinting in cache memory onboard a microprocessor, according to an embodiment of the present disclosure.

FIG. 10 is a block diagram of a system architecture 1000 designed to mitigate memory imprinting in cache memory onboard a microprocessor, such as the microprocessor 800 or the DSP 900 of FIGS. 8-9, according to an embodiment of the present disclosure. The architecture 1000 is similar to the architecture 100 of FIG. 2, where the architecture 1000 includes a Bus Mode Register Control 1040, a Bi-Directional Data Bus Inverter 1050 and a Bus Mode Control NVM 1060, corresponding to the elements 140, 150 and 160, respectively, of FIG. 2.

In the case of the architecture 1000, the memory imprint mitigation is targeted to the processor's cache memory which is onboard the integrated circuit (IC) itself, rather than the full volatile memory module which may be external. As discussed in the preceding paragraphs relative to FIGS. 8 and 9, the cache memory may contain the same data in some registers for an extended amount of time, thus becoming susceptible to memory imprinting.

An IC die carrier Printed Circuit Board (PCB) 1002 includes an IC die 1004, where it is to be understood that other elements (not shown) besides the IC die 1004 may exist on the PCB 1002. IC package input output solder bumps 1006 allow connection of the IC die 1004 to other elements on the PCB 1002 or other circuit boards. A processor core Arithmetic Logic Unit (ALU) 1010 is the element which performs the actual mathematical and/or logic calculations which are the purpose of the device—whether a digital signal processor, a graphics processing unit, a generalized microprocessor, or otherwise.

Internal Cache Memory 1020 is the cache module which has been discussed extensively above—that is, the high-speed onboard RAM element which may be susceptible to memory imprinting, and which the architecture 1000 is designed to protect from imprinting.

An internal cache memory controller 1022 controls data flowing into and out of the cache 1020, including data and signals on a cache address bus 1024, a cache control bus 1026 and a cache data bus 1028. An external memory interface 1030 controls communication between the ALU 1010, the cache 1020, and external volatile and non-volatile memory. That is, the interface 1030 enables data reads/writes between the ALU 1010 and external memory when necessary, also allows data fetches from external memory to the cache 1020, and direct provision of data from the cache 1020 to the ALU 1010 whenever possible. These data flow paths are shown by the arrows in the box of the interface 1030.

The communication with the external memory is via an external address bus 1032, an external control bus 1034 and an external data bus 1036, which are equivalent to the address/control/data buses 122/124/126 of FIG. 2. A processor address bus 1012, a processor control bus 1014 and a processor data bus 1016 provide communication between the ALU 1010 and the external memory interface 1030.

A dashed-outline area 1070 contains the elements which are added to a standard processor for the memory imprint mitigation architecture 1000. The operation of the architecture 1000 of FIG. 10 is very similar to the operation of the architecture 100 of FIG. 2 discussed previously. When the bus mode register control 1040 determines that the cache 1020 should be operated in inversion mode, the data bus inverter 1050 inverts data bits flowing in an out of the cache 1020. This inversion affects all data flowing in and out of the cache 1020, regardless of the source or destination of the data (ALU 1010 or external memory). Because of the location of the data bus inverter 1050, nothing else needs to be changed in the architecture 1000 compared to a standard processor architecture. That is, the ALU 1010, the interface 1030 and the external memory always see the non-inverted data bits that they expect. Only the cache 1020 sees inverted data bits (when the system is running in inversion mode), thus providing memory imprint mitigation in the cache 1020.

As discussed previously relative to the architecture 100 of FIG. 2, the bus mode register control 1040 determines whether to run in normal mode or inversion mode at system start-up based on normal mode and inversion mode counter data stored in the bus mode control NVM 1060. The goal of the system is to balance normal mode and inversion mode operation over the lifetime of the system. The NVM 1060 can be implemented on the IC die 1004 (as shown by reference numeral 1060), or it may reside on the PCB 1002 (1060A), or it may reside entirely external to the PCB 1002 (1060B).

The architecture 1000 is designed to mitigate memory imprinting in a processor's onboard cache, while the architecture 100 is designed to mitigate imprinting in main system RAM external to a processor.

Another application for the memory imprint mitigation techniques of the present disclosure is in Field Programmable Gate Array (FPGA) configuration memory. In a typical FPGA device, the configuration memory cells (inaccessible from outside the chip and typically not accessible to the user's design from inside the chip) are used to store binary values unique for a given user's design and will stay at the same value for the duration of the use of the part in the system while power is applied. This makes FPGA configuration memory cells vulnerable to memory imprinting. This FPGA application is discussed in detail below.

Figure 11:
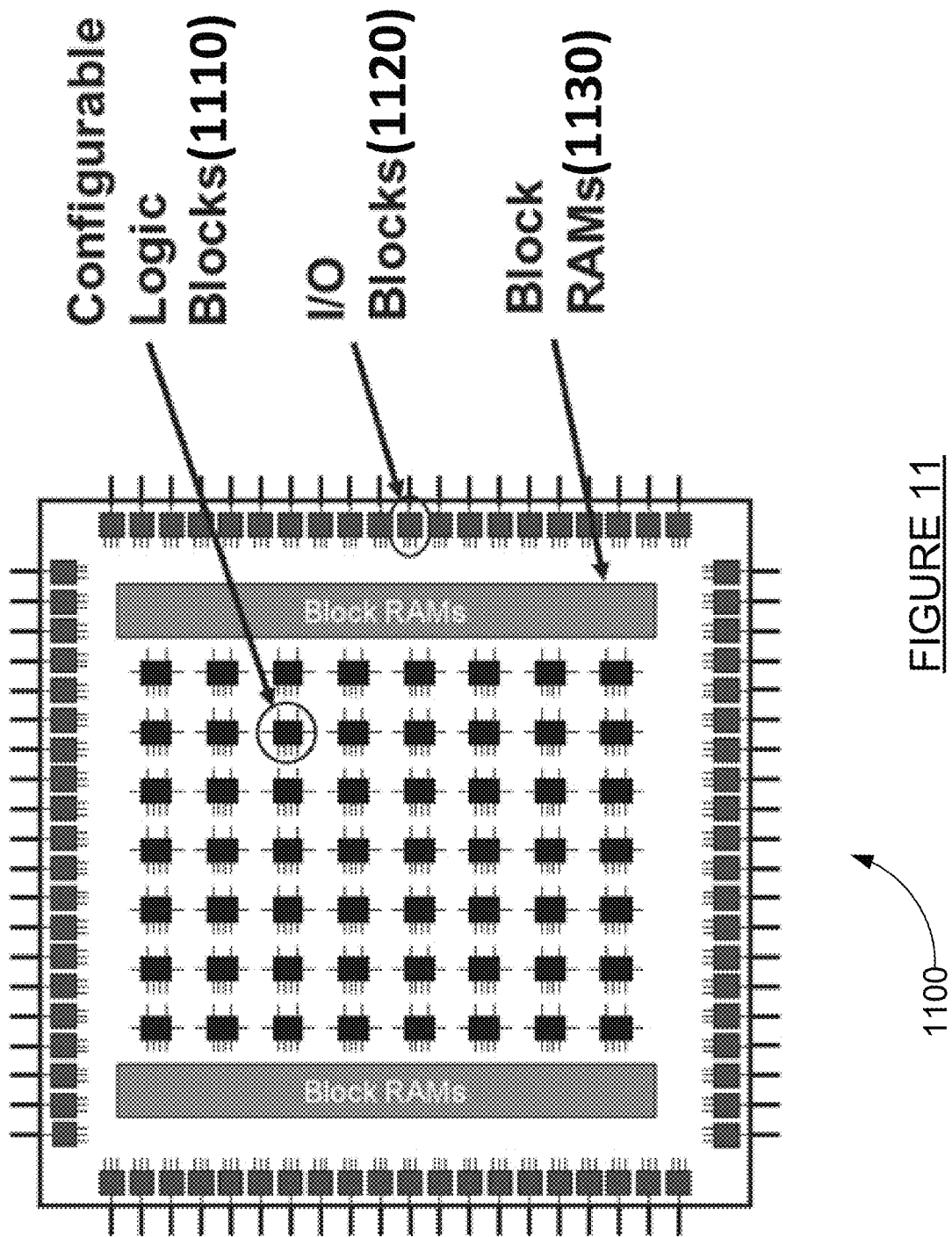
FIG. 11 is an illustration of a physical top view of a SRAM-based Field Programmable Gate Array (FPGA) device.

FIG. 11 is an illustration of a physical top view of a SRAM-based Field Programmable Gate Array (FPGA) device 1100. The FPGA 1100 includes configurable logic blocks 1110, I/O blocks 1120 and Block RAMs 1130. A convenient way to understand an FPGA is to use a three dimensional sandwich model of transistor layers, surrounded around the outside by hundreds to thousands of the I/O cells 1120 connecting to the external portions of the integrated circuit package. FPGA devices are high density integrated circuits leveraging the latest IC fabrication techniques as small as 10 nanometers (nm) and implementing as many as 2-10 billion transistors.

Figure 12:
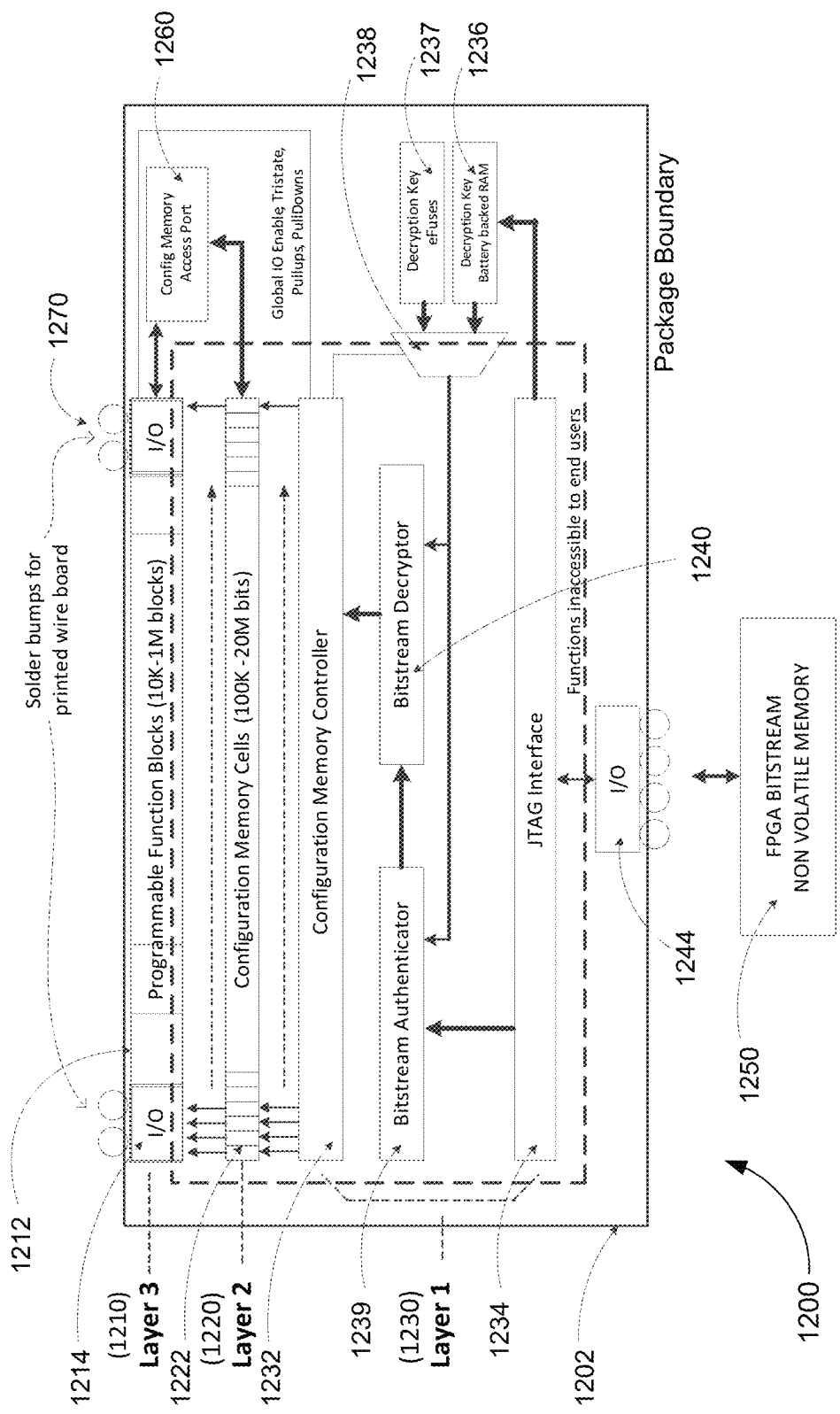
FIG. 12 is a cross-sectional view of a three dimensional model of a traditional implementation of an FPGA architecture.

FIG. 12 is a cross-sectional view of a three dimensional model of a traditional implementation of an FPGA architecture 1200 including an FPGA 1202. In the three dimensional model, a top layer 1210 (layer 3) can be thought of as the "programmable logic" and "programmable I/O" layer, a middle layer 1220 (layer 2) as the "configuration memory" layer, and a bottom layer 1230 (layer 1) as the "Configuration memory controller" layer. Layer 3 (1210) is partitioned into a matrix of identical logic blocks 1212. Layer 3 (1210) may consist of thousands to nearly a million of the logic blocks 1212, with the outside ring of the matrix consisting of programmable I/O blocks 1214.

Each layer 3 logic block 1212 or I/O block 1214 is individually configured to perform a specific logic or I/O function by layer 2's configuration memory cells 1222. There is a many-to-one mapping of layer 2 memory cells 1222 to layer 3 logic blocks 1212. In the model of FIG. 12, assume that 100 layer 2 memory cell outputs are connected to each layer 3 logic or I/O block 1212. If there are 50K layer 3 logic blocks 1212, and 1K layer 3 I/O blocks 1214, there will be a corresponding 50K×100=5 M layer 2 memory cells 1222 for the logic blocks 1212, and 1K×100=100K layer 2 memory cells 1222 for the I/O blocks 1214. Each layer 2 memory cell 1222 is initially loaded by a layer 1 configuration memory controller 1232 during power up. Layer 1 (1230) consists of an external memory interface (JTAG) 1234, a small amount of battery-backed SRAM memory 1236 and/or eFuses 1237 used to provide a user-programmable decryption key via a selection multiplexer 1238, a bitstream authenticator 1239 and a bitstream decryptor 1240, and finally, the configuration memory controller 1232.

A configuration memory access port 1260 provides communication between the configuration memory cells 1222 of layer 2 (1220) and the I/O blocks 1214 of layer 3 (1210), for some specific functions. Furthermore, the I/O blocks 1214 of layer 3 (1210) are configured with solder bumps 1270 for connection of the FPGA 1202 to a circuit board, as would be understood by one skilled in the art.

In most FPGA devices, the internal contents of SRAM configuration memory are loaded at device power up from an external memory device 1250. The FPGA's configuration memory file, also known as the FPGA Image or FPGA Bitstream, is often stored in an encrypted state on the external memory device 1250 (e.g., non-volatile FLASH memory). At power up, the FPGA 1202 sequentially reads the external encrypted file from the device 1250 via an I/O block 1244. The FPGA 1202 then internally decrypts the file using one of two multiplexer-selected decryption keys which is resident in the FPGA and has been stored in the FPGA prior to the power up cycle. The decryption key selected at the multiplexer 1238 is either a result of the battery-backed SRAM 1236, or is a function of the electrically alterable internal fuses (eFuses 1237).

As the incoming file is decrypted, the decrypted contents are written to the FPGA's internal configuration memory cells 1222. Present FPGA devices utilize hundreds of thousands to millions of configuration bits. Unless the design is changed and a different bitstream and decryption key is used, the FPGA image stored in the external memory device is written into the identical configuration memory cells 1222 at each power up. These configuration memory cells 1222, not accessible from outside the chip and typically not accessible to the user's design from inside the chip, are intentionally static so as to enable the FPGA to implement the user's design for the duration of the use of the part in the system while power is applied. It is precisely this FPGA configuration memory 1222 which is affected by the memory imprinting phenomena. Utilizing the scheme described in this disclosure, FPGA vendors can drastically reduce the effects of configuration memory imprinting.

Figure 13:
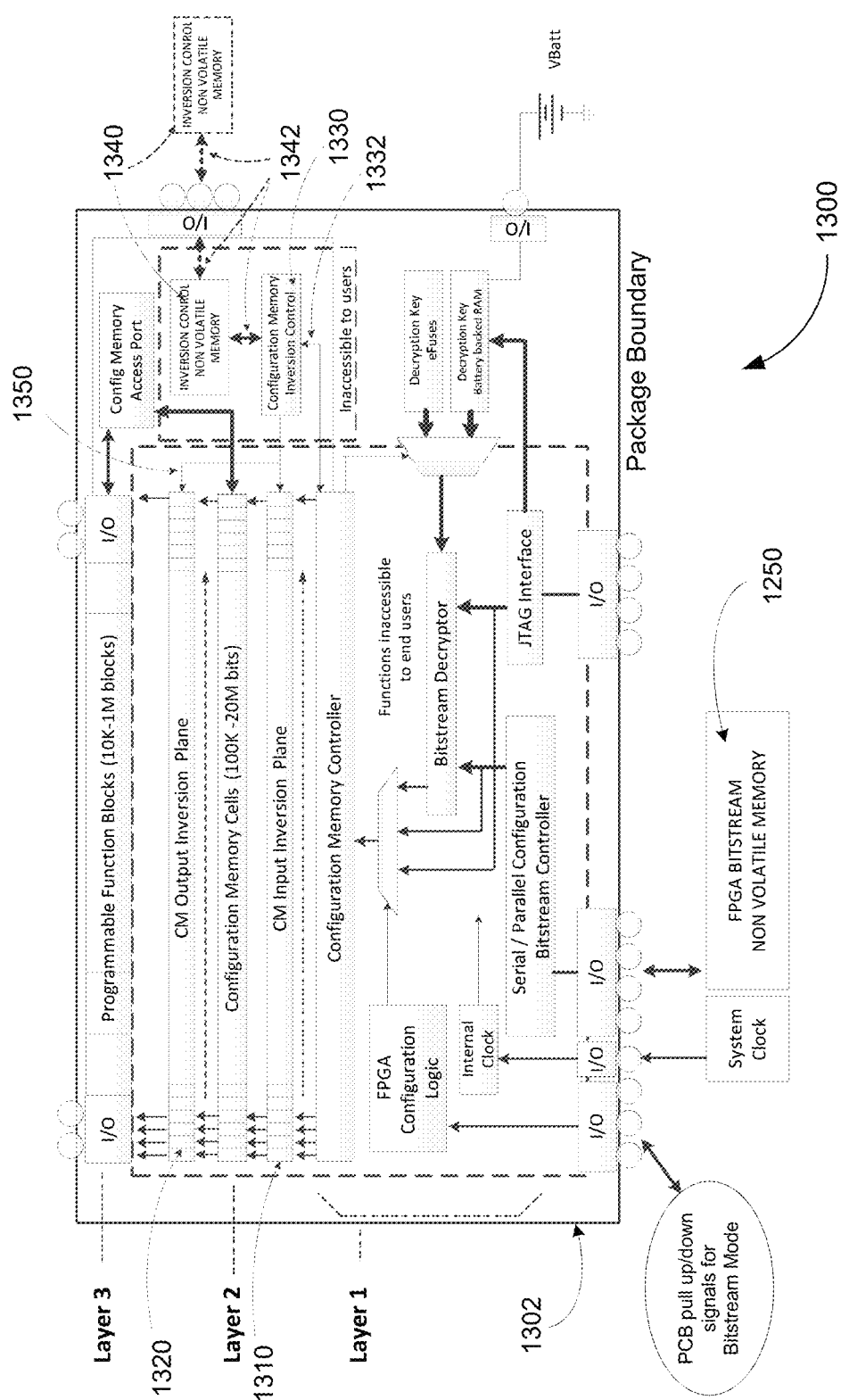
FIG. 13 is a cross-sectional view of a three dimensional model of an FPGA architecture with memory imprinting protection, according to an embodiment of the present disclosure.

FIG. 13 is a cross-sectional view of a three dimensional model of an FPGA architecture 1300 including an FPGA 1302 with memory imprinting protection, according to an embodiment of the present disclosure. FIG. 13 shows the same architecture as the generalized FPGA architecture 1200, but with the addition of configuration memory inversion planes for memory cell input (1310) and output (1320), a Configuration Memory Inversion Controller 1330 and Inversion Control Non-Volatile Memory (NVM) 1340. The function of the configuration memory inversion controller 1330 is identical to that of the Bus Mode Register Control 140 shown in FIG. 2 and discussed above.

As part of the FPGA startup process, the layer 1 configuration memory controller 1232 communicates with and initiates the configuration memory inversion controller 1330 on a line 1332. On a line 1350, the configuration memory input inversion plane 1310 receives a signal from the configuration memory inversion controller 1330 indicating whether the FPGA 1302 is operating in normal mode or inversion mode. When in inversion mode, the configuration memory input inversion plane 1310 inverts (swaps values of logical 1's and 0's) bits flowing from the configuration memory controller 1232 into the configuration memory cells 1222 (of FIG. 12). Likewise, when the FPGA 1302 is operating in inversion mode, the configuration memory output inversion plane 1320 inverts bits flowing from the layer 2 configuration memory cells 1222 to the programmable function blocks 1212. The configuration memory output inversion plane 1320 also receives, on the line 1350, the signal from the configuration memory inversion controller 1330 indicating whether the FPGA 1302 is operating in normal mode or inversion mode. In this way, the contents of the configuration memory cells 1222 are protected from memory imprinting, as each individual configuration memory cell spends about half of its life in a low voltage state and half of its life in a high voltage state.

The configuration memory inversion controller 1330 communicates with the inversion control NVM 1340 on a line 1342. The inversion control NVM 1340 may be onboard the FPGA package (as shown with solid outline), or may be separate from the FPGA package (as shown with dashed outline). The configuration memory inversion controller 1330 has a system clock input and keeps track of time running in normal mode or inversion mode for each power-on session, writing updated values to the inversion control NVM 1340 during system shutdown. Like the bus mode control NVM 160 of FIGS. 2, 3 and 5, the inversion control NVM 1340 stores values of cumulative normal mode time and inversion mode time, and allows this information to be used by the configuration memory inversion controller 1330 to determine whether to select normal mode or inversion mode at each system power-up.

Figure 14:
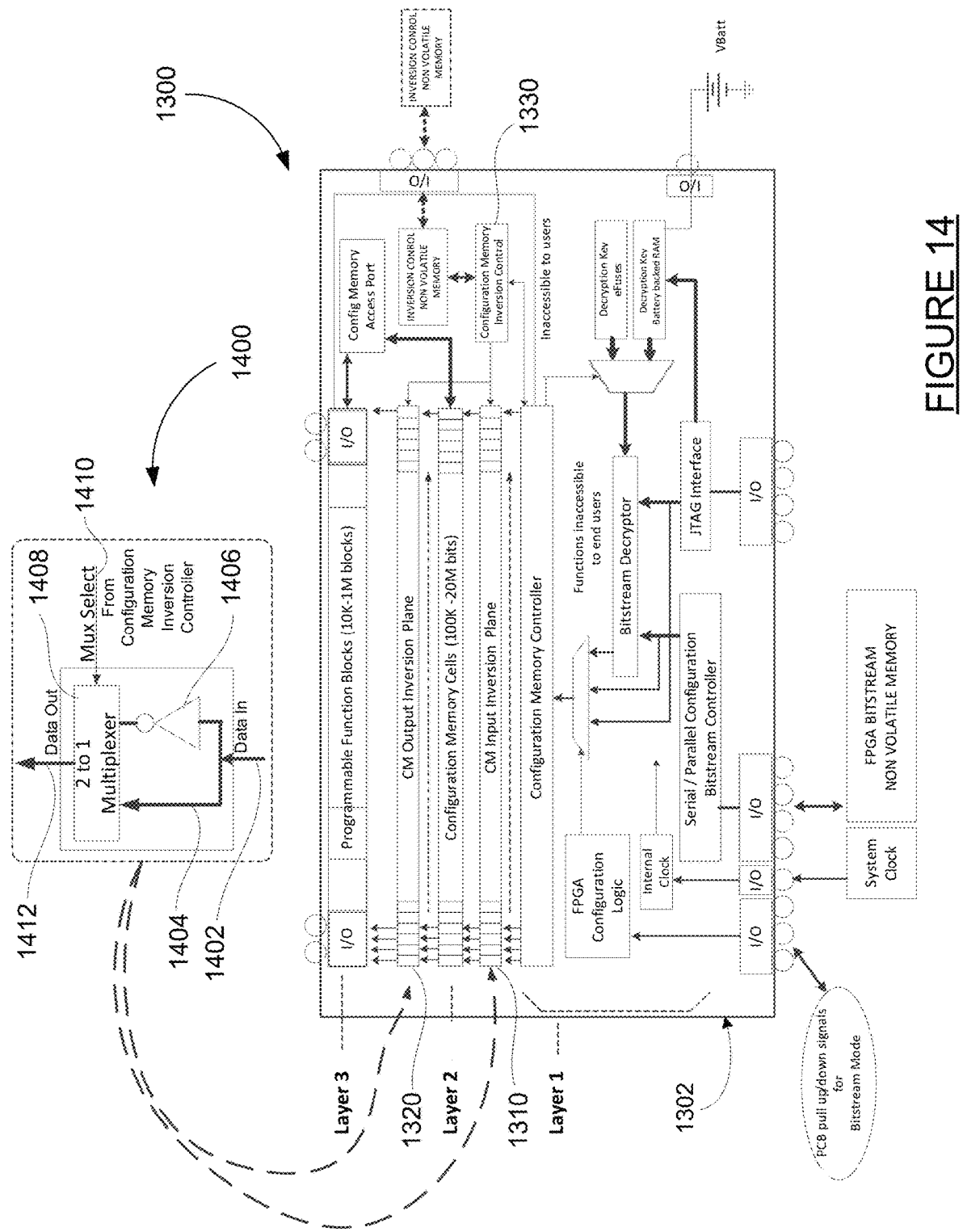
FIG. 14 is a cross-sectional diagram of the FPGA architecture with memory imprinting mitigation of FIG. 13, with additional detail showing how multiplexed configuration memory inversion elements are used in each of two configuration memory inversion planes.

FIG. 14 is a cross-sectional diagram of the FPGA architecture 1300 with memory imprinting mitigation as shown in FIG. 13, with additional detail showing how multiplexed configuration memory inversion elements 1400 are used in each of the two configuration memory inversion planes 1310 and 1320. The CM inversion planes 1310/1320 are made up of a layer of these inversion elements 1400, with a common select control driven by the configuration memory inversion controller 1330.

Each of the configuration memory cells 1222 has one of the inversion elements 1400 connected to its input (in the plane 1310) and another inversion element 1400 connected to its output (in the plane 1320). Each of the inversion elements 1400 comprises a data input line 1402. The data input line 1402 branches to a pass-through connector 1404 and an inversion gate 1406, both of which provide input to a multiplexer (MUX) 1408. The MUX 1408 also receives a selection signal from the configuration memory inversion controller 1330 on line 1410, indicating whether the FPGA 1302 is operating in normal or inversion mode. When the FPGA 1302 is operating in normal mode, the MUX 1408 outputs the non-inverted data from the pass-through connector 1404 to an output line 1412. When the FPGA 1302 is operating in inversion mode, the MUX 1408 outputs the inverted data from the inversion gate 1406 to the output line 1412.

Although the physical implementations are different, the mode of use of the imprinting protection shown in FIG. 14 is identical to that of the previously-discussed circuit card with processor architecture (FIGS. 2-5): For every power up event, the configuration memory controller 1330 decides the logic level (operating mode) of the inversion control and communicates the mode to the CM inversion planes 1310/1320—where operation in normal mode is balanced over time with operation in inversion mode.

The techniques disclosed above can be employed for mitigation of memory imprinting (data remanence) in the volatile memory or configuration memory of many different types of electronic systems. By minimizing the effects of memory imprinting, the security of electronic systems is improved as they are less susceptible to adversarial extraction of executable code and data.

The foregoing discussion describes merely exemplary embodiments of the disclosed methods and systems. One skilled in the art will readily recognize from such discussion and from the accompanying drawings and claims that various changes, modifications and variations can be made therein without departing from the spirit and scope of the disclosed techniques as defined in the following claims.

What is claimed is:

1. A method for mitigating memory imprinting in configuration memory (CM) of a field programmable gate array (FPGA) device, said method comprising:

providing an FPGA device with a CM input inversion plane between a CM controller and a layer of CM cells, a CM output inversion plane between the layer of CM cells and a programmable function block layer, and a CM inversion control module in communication with the CM input and output inversion planes;

determining, by the CM inversion control module at system power-up, whether to select a normal mode or an inversion mode for a current power cycle;

inverting, by the CM input and output inversion planes when operating in the inversion mode, data flowing into and out of the layer of CM cells, where inverting includes swapping values of logical ones and zeroes;

tracking, by the CM inversion control module, cumulative system times operating in the normal mode and the inversion mode; and writing the cumulative system times to a CM mode non-volatile memory module, at system power-down, for use in determining which mode to select at a next system power-up.

2. The method according to claim 1 wherein determining whether to operate a current power cycle in a normal mode or an inversion mode includes reading the cumulative system times from the CM mode non-volatile memory module and setting the current power cycle to a mode with less cumulative time.

3. The method according to claim 1 wherein the CM inversion control module communicates a mode control bit to the CM input and output inversion planes, where the mode control bit designates the normal or the inversion mode.

4. The method according to claim 3 wherein the CM input and output inversion planes include a plurality of inversion elements, one inversion element for each memory cell in the layer of CM cells, and each of the inversion elements includes a multiplexer (MUX) having a single output and two inputs, where the inputs consist of a normal input and an inverted input.

5. The method according to claim 4 wherein the inversion elements in the CM input and output inversion planes select the normal input to the MUX when the mode control bit designates the normal mode, and the inversion elements select the inverted input to the MUX when the mode control bit designates the inversion mode.

6. The method according to claim 4 wherein the normal input is a pass-through of an incoming data stream, and the inverted input includes an inversion gate which inverts the incoming data stream.

7. The method according to claim 1 wherein the FPGA device is used in an embedded control system in a vehicle, an aircraft or a machine.

8. A programmable logic device having volatile memory imprint mitigation, said programmable logic device comprising:

a configuration memory (CM) controller receiving a bitstream from an external memory device;

a layer of CM cells receiving bits from the CM controller;

a programmable function block layer including a plurality of function blocks each receiving bits from one or more of the CM cells;

a CM input inversion plane in a communication path between the CM controller and the layer of CM cells;

a CM output inversion plane in a communication path between the layer of CM cells and the programmable function block layer; and a CM inversion control module in communication with the CM input and output inversion planes, where the CM inversion control module is configured to determine at device power-up whether to operate a current power cycle in a normal mode or an inversion mode, and where the CM input inversion plane inverts, when operating in the inversion mode, the bits received by the CM cells from the CM controller, where inverting includes swapping values of logical ones and zeroes, and the CM output inversion plane inverts, when operating in the inversion mode, the bits received by the programmable function block layer from the CM cells.

9. The programmable logic device according to claim 8 wherein the CM inversion control module is further configured to record cumulative device times operating in the normal mode and the inversion mode, periodically and at device power-down, for use in determining which mode to select at a next device power-up.

10. The programmable logic device according to claim 9 wherein the CM inversion control module determines whether to operate the current power cycle in the normal mode or the inversion mode by evaluating the cumulative device times which were previously recorded and setting the current power cycle to a mode with less cumulative time.

11. The programmable logic device according to claim 8 wherein the CM inversion control module communicates a mode control bit to the CM input and output inversion planes, where the mode control bit designates the normal mode or the inversion mode.

12. The programmable logic device according to claim 11 wherein the CM input and output inversion planes include a plurality of inversion elements, one inversion element for each memory cell in the layer of CM cells, and each of the inversion elements includes a multiplexer (MUX) having a single output and two inputs, where the inputs consist of a normal input and an inverted input.

13. The programmable logic device according to claim 12 wherein the inversion elements in the CM input and output inversion planes select the normal input to the MUX when the mode control bit designates the normal mode, and the inversion elements select the inverted input to the MUX when the mode control bit designates the inversion mode.

14. The programmable logic device according to claim 12 wherein the normal input is a pass-through of an incoming data stream, and the inverted input includes an inversion gate which inverts the incoming data stream.

15. The programmable logic device according to claim 8 wherein the device is a field programmable gate array (FPGA).

16. The programmable logic device according to claim 8 wherein the programmable logic device is part of an embedded control system in a vehicle, an aircraft or a machine.

17. A memory imprint mitigation system for a programmable logic device, said system comprising:

a configuration memory (CM) input inversion plane in a communication path between a CM controller and a layer of CM cells;

a CM output inversion plane in a communication path between the layer of CM cells and a programmable function block layer; and a CM inversion control module in communication with the CM input and output inversion planes, where the CM inversion control module is configured to determine at device power-up whether to operate a current power cycle in a normal mode or an inversion mode, and where the CM input inversion plane inverts, when operating in the inversion mode, the bits received by the CM cells from the CM controller, where inverting includes swapping values of logical ones and zeroes, and the CM output inversion plane inverts, when operating in the inversion mode, the bits received by the programmable function block layer from the CM cells.

18. The system according to claim 17 wherein the CM inversion control module is further configured to record cumulative device times operating in the normal mode and the inversion mode, periodically and at device power-down, and to determine which mode to select at a next device power-up by evaluating the cumulative device times which were previously recorded and setting the current power cycle to a mode with less cumulative time.

19. The system according to claim 17 wherein the CM inversion control module communicates a mode control bit to the CM input and output inversion planes, where the mode control bit designates the normal mode or the inversion mode.

20. The system according to claim 19 wherein the CM input and output inversion planes include a plurality of inversion elements, one inversion element for each memory cell in the layer of CM cells, and each of the inversion elements includes a multiplexer (MUX) having a single output and two inputs, where the inputs consist of a normal input and an inverted input, and the MUX selects one of the inputs based on the mode control bit.

* * * * *